May 3, 1966     M. J. JACKSON     3,249,140
TREE DISPOSAL DEVICE
Filed Nov. 5, 1963
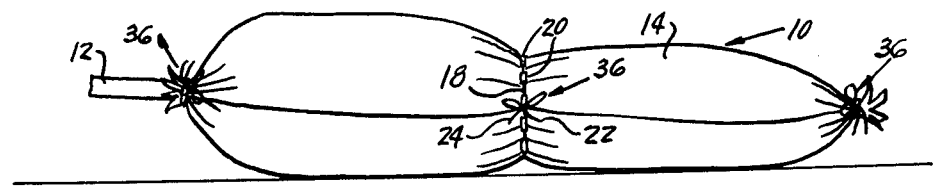
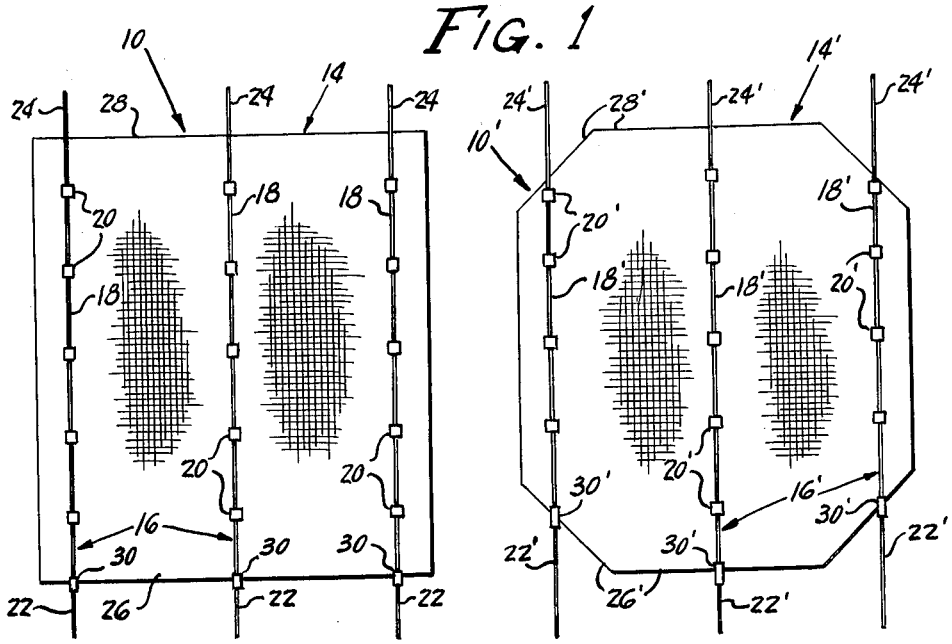
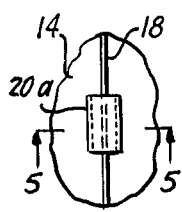
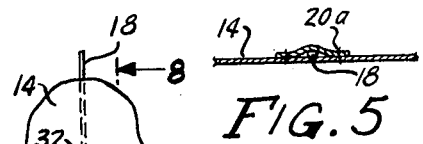
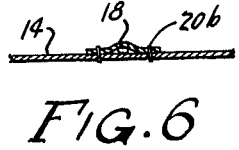
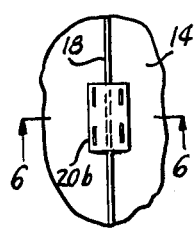
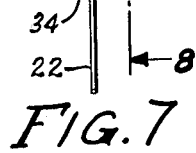
INVENTOR.
MILDRED J. JACKSON
BY
*Kimmel & Crowell*
ATTORNEYS.

United States Patent Office 3,249,140
Patented May 3, 1966

3,249,140
TREE DISPOSAL DEVICE
Mildred J. Jackson, 549 W. Allen St., Springfield, Ill.
Filed Nov. 5, 1963, Ser. No. 321,495
3 Claims. (Cl. 150—52)

This invention relates to a tree disposal device and more particularly to a device for covering and enveloping a tree such as a Christmas tree or the like to facilitate transportation and disposal of the same.

It is to be understood that although the instant specification is particularly described in terms of disposing of a tree such a pine tree after the Christmas season, the device herein disclosed could be readily utilized in any instance where a tree having outwardly extending branches, particularly of the type carrying a plurality of needles or the like, is to be moved from one place to another.

A primary object of this invention is the provision of a device adapted to cover and envelop a tree, particularly the branches thereof, to render the same convenient for transportation and disposal.

Another object of this invention is the provision of a device of the character described which is sufficiently yieldable to conform to the shape of the tree while including means to compress the branches resulting in a more compact package for ease in handling.

Yet another object of this invention is the provision of such a device which may be made either highly flammable if the tree is to be disposed of immediately after transportation or non-flammable if the tree is to be stored for any length of time.

Still another object of this invention is to provide a device for enveloping the branches of a tree which is sturdy and durable in construction, and simple and inexpensive to manufacture and utilize.

Other and further objects reside in the combination of elements, arrangement of parts, and features of construction.

Still other objects will in part be obvious and in part be pointed out as the description of the invention proceeds and as shown in the accompanying drawing wherein:

FIGURE 1 is a side elevational view, to a reduced scale, of a tree or article having its branches or flexible members enveloped by a device in accordance with the instant invention;

FIGURE 2 is a bottom plan view of one form of disposal device in accordance with this inventive concept;

FIGURE 3 is an enlarged fragmentary view of one of the loop means for slidably receiving the flexible tying and girth member of the device;

FIGURE 4 is an enlarged fragmentary view of a modified loop means;

FIGURE 5 is a transverse cross-sectional view taken substantially on line 5—5 of FIGURE 3;

FIGURE 6 is a transverse sectional view taken substantially on line 6—6 of FIGURE 4;

FIGURE 7 is an enlarged fragmentary view of a fastening means for securing one end of the flexible tying member to the covering member of the device of the instant invention;

FIGURE 8 is a vertical cross-sectional view taken substantially on line 8—8 of FIGURE 7; and FIGURE 9 is a bottom plan view similar to FIGURE 2 of a modified device.

Similar reference characters refer to similar parts throughout the several views of the drawing.

Referring now to the drawing, and more particularly to FIGURE 1, a disposal device in accordance with the instant invention is designated generally by the reference numeral 10 and is shown as enveloping, for example, the branches (not seen) of a tree having a substantially longitudinally extending trunk 12.

The device 10 comprises basically a covering member 14 of uniform texture which may be formed of any suitable material such as cheesecloth, tobacco cloth or knit material that would stretch and yield slightly to conform to the shape of the tree while retaining any loose needles or the like therewithin. The material forming the cover member 14 may be inherently flammable or inherently non-flammable or may be impregnated with any means well known in the art for rendering the same flammable or non-flammable, as desired. The covering member 14 may be made of any desired size and shape such as, for example, a substantially square or rectangular covering member as shown in FIGURE 2, or an octagonal member as shown at 14' in FIGURE 9, the latter shape being advantageous in that the decreased side portions more readily conform to the decreased dimensions of the branches at the top of a pine tree or the like and the trunk below the lowermost branches of the same. A plurality of girth type securing means designated generally by the reference numeral 16 are engaged around the covering member 14 spaced longitudinally of the tree for fastening the cover member in enveloping relationship with respect to the branches thereof.

Each of the girth type securing means 16 preferably includes an elongated flexible member such as a string, or cord 18 slidingly attached to the covering member 14 transversely of the same by being received through a plurality of longitudinally spaced rows of loop means 20, with end portions 22, 24 of the flexible members 18 extending beyond opposite edges 26, 28 of the covering member 14, respectively.

The loop means may be formed of cloth, tape, or the like, and sewn to the covering member 14 as shown as at 20a in FIGURES 3 and 5 or stapled thereto as shown at 20b in FIGURES 4 and 6.

Fastener means or plate-like fixture member 30 shown particularly in FIGURES 7 and 8 has oppositely disposed sharp and steep claw member ends 32, 34, one end of which fixedly secures each flexible member 18 at the edge 26 of the covering member 14. The plate-like fixture member 30 has opposite rebent ends bent towards the same face of the plate, each of said ends formed as claws with a series of adjacent sharp projections and alternate steep valleys extending from the distal ends toward the bend lines. The flexible girth member 18 is crowded into a valley between the projections when the latter are forced through cover member 14; also, the rebent sharp claws contact cover member 14, and keep girth member 18 tightly compacted between plate-like fixture member 30 and cover member 14, and affixed to a marginal portion of the cover member. The other and unencumbered end of 30 may be readily engaged inwardly spaced from the opposite edge 28 of the covering member 14 to temporarily secure the covering member in enveloping relationship with respect to the branches of the tree until the opposite end portions 22, 24 of the flexible members 18 can be secured to each other, such as by tying a knot or bow as seen at 36 in FIGURE 1.

The embodiment shown in FIGURE 9 is substantially the same as the embodiment of FIGURE 2 except for the specific shape of the covering member, and like parts have been designated by the same reference numeral with the addition of a prime (').

The use and operation of the device of the instant invention will now be apparent and will be described with particular reference to FIGURE 2. The device 10 may be stretched out on a supporting surface such as the floor or the like with the covering member 14 substantially flat and the securing means 16 against the floor surface. The tree is then laid over the covering member 14 with the trunk 12 disposed substantially perpendicularly to the securing means 16 and the branches resting on the covering member 14. If necessary, a plurality of devices in accordance with this invention may be utilized for enveloping larger trees. The edges 26, 28 of the covering member are then brought around the branches of the tree in relatively tight engagement therewith to substantially compress the same against the trunk 12 as shown in FIGURE 1, and then the claw members 34 of fastening means 30 are engaged in the covering member 14 in a conventional manner, spaced inwardly from the edge 28 sufficiently to provide temporary holding. If necessary, the flexible members 18 may be removed from certain of the end loop means 20 to provide ample freedom and the end portions 22, 24 thereof may then be adjustably secured to each other as shown at 36 with the covering member 14 being drawn tight by sliding movement of the flexible members 18 within the loop means 20 toward the end portions 28, the end portions 22 being fixedly secured to the covering member 14 at the edge 26 thereof by the fastening means 30.

It is to be understood that although the flexible members 18 and the fastener means 30 have been shown as used in combination, that either of these constructions may be utilized separately as the sole securing means for fastening the cover member 14 in enveloping relationship with respect to the branches of the tree.

It will now be seen that there is herein provided an improved device of the character described which satisfies all the objectives of the instant invention, and others, including many advantages of great practical utility and commercial importance.

Since many embodiments may be made of the instant inventive concept, and since many modifications may be made in the embodiments hereinbefore shown and described, it is to be understood that all matter herein is to be interpreted as illustrative, and not in a limiting sense.

I claim:

1. A disposal device for a tree or similar article having a substantially longitudinally extending center pole or trunk and a plurality of angularly outstanding flexible members or branches connected thereto, comprising, in combination, a yieldable sheet cover member having a first and second pair of parallel edges, and of sufficient size as to be wrapped peripherally around the outstanding compressed flexible members or branches, an elongated flexible peripheral girth member slidably attached to and at one face only of said cover member adjacent each of the first parallel pair of edges of said cover member, and of a length of extend beyond the second parallel pair of edges of said cover member, and at least another similar girth member parallel to and spaced between said first pair of edge girth members, rows of spaced loop means covering and having frictional sliding contact with portions of each of said girth members, and plate-like fixture members, with opposite rebent ends bent towards the same face of the plate, each of said ends formed as claws with a series of adjacent sharp projections and alternate steep valleys extending from the distal ends to the bend lines, one end of each fixture member being placed astride a portion of each girth member with the girth member crowded into a valley, the one end portion of the fixture then passing completely through a marginal portion of said cover member and being tightly affixed thereto by the sharp projections of the claw, a portion of each girth member passing from said valley to a position between the tightly affixed marginal portion of the cover member and a portion of the fixture end, the opposite claw end of the plate-like fixture member being spaced away from said marginal portion of said cover member, said adjacent portion of said girth member being free of fixation with respect to said opposite claw end, thus providing an unencumbered claw end for each fixture, whereby said unencumbered end of each fixture member is free to claw into and temporarily hold other portions of the cover member when the cover member is wrapped around the tree or article, whereby the girth members are free to independently take up and hold the cover member encircled about the tree or article, by tying the mutual ends.

2. The structure of claim 1 wherein said loop means covering said girth members are oblong in shape and are attached to said cover by means of a plurality of staples at each side of said loop.

3. The structure of claim 1 wherein said cover member is octagonal with two further pairs of parallel and shorter length edges as compared to the length of said first and second pair of edges.

References Cited by the Examiner

UNITED STATES PATENTS

| | | | |
|---|---|---|---|
| 312,637 | 2/1885 | Hopkins | 24—17 |
| 588,851 | 8/1897 | Barnum. | |
| 857,435 | 6/1907 | Bell | 150—52 |
| 983,492 | 2/1911 | Harriss | 150—52 |
| 2,128,693 | 8/1938 | Dowd | 150—52 |
| 2,618,880 | 11/1952 | Sourek | 150—52 X |
| 2,705,557 | 4/1955 | Hartman | 150—52 X |
| 2,847,805 | 8/1958 | Robbins. | |
| 2,850,842 | 9/1958 | Eubank | 150—52 X |

GEORGE O. RALSTON, Primary Examiner.

FRANKLIN T. GARRETT, Examiner.